(12) United States Patent
Lominadze

(10) Patent No.: US 12,724,496 B1

(45) Date of Patent: Sep. 1, 2026

(54) CONTROLLERS AND SENSORS INCORPORATING OPTICAL FLEXION SENSORS

(71) Applicant: George Lominadze, Bronxville, NY (US)

(72) Inventor: George Lominadze, Bronxville, NY (US)

( * ) Notice: Subject to any disclaimer, the term of this patent is extended or adjusted under 35 U.S.C. 154(b) by 0 days.

(21) Appl. No.: 19/220,032

(22) Filed: May 27, 2025

(51) Int. Cl.
*G06F 3/03* (2006.01)
*G01D 5/34* (2006.01)
*G06F 3/0338* (2013.01)

(52) U.S. Cl.
CPC ............. *G06F 3/0304* (2013.01); *G01D 5/34* (2013.01); *G06F 3/0338* (2013.01)

(58) Field of Classification Search
CPC ........ G06F 3/0304; G06F 3/0338; G01D 5/34
See application file for complete search history.

(56) References Cited

U.S. PATENT DOCUMENTS 3,414,344 A 12/1968 Mukojima
4,036,218 A 7/1977 Yamashita et al.
4,533,827 A 8/1985 Fincher
4,731,530 A 3/1988 Mikan
4,784,118 A 11/1988 Fantone et al.
4,880,970 A 11/1989 Jones
4,972,074 A * 11/1990 Wright ................ G02B 6/4202 250/221
5,065,146 A 11/1991 Garrett
5,621,207 A 4/1997 O'Mara
5,633,494 A * 5/1997 Danisch ............ G01D 5/35377 250/227.16
5,888,193 A 3/1999 Breidenthal et al.
5,911,627 A * 6/1999 Piot ....................... G05G 9/047 463/38
5,943,233 A 8/1999 Ebina et al.
6,121,955 A 9/2000 Liu
6,195,083 B1 2/2001 Salcudean et al.
6,222,179 B1 * 4/2001 Mikan .................. G05G 9/047 250/221
6,300,940 B1 10/2001 Ebina et al.
(Continued)

FOREIGN PATENT DOCUMENTS

| | | |
|---|---|---|
| DE | 10342335 A1 | 5/2005 |
| EP | 1394652 A1 | 3/2004 |
| WO | 2003087729 | 10/2003 |

*Primary Examiner* — Christopher E Leiby
(74) *Attorney, Agent, or Firm* — Weber Rosselli & Cannon LLP

(57) ABSTRACT

Controllers and sensor systems include a base member, a movable member operably coupled to the base member, and at least first and second flexible light guide assemblies extending between the movable member and the base member. Each flexible light guide assembly includes a flexible light guide and an associated light sensor. The systems may include a processor coupled to the light sensors, and a memory storing instructions that, when executed, cause the processor to receive light sensor data from the light sensors, and calculate position data of the movable member based on the received light sensor data. In aspects, the systems may incorporate additional flexible light guide assemblies. In one example, a controller system may include a joystick incorporating four flexible light guide assemblies to provide enhanced spatial resolution and directional control.

19 Claims, 12 Drawing Sheets

(56) References Cited

U.S. PATENT DOCUMENTS

| | | | | |
|---|---|---|---|---|
| 6,329,647 | B1 | 12/2001 | Mikan | |
| 6,545,662 | B1 | 4/2003 | Noll et al. | |
| 6,597,453 | B1 | 7/2003 | Shu-Ming | |
| 7,026,959 | B2 | 4/2006 | Orrico et al. | |
| 7,452,107 | B2 | 11/2008 | Eckert et al. | |
| 7,492,352 | B2 | 2/2009 | Hsu et al. | |
| 8,094,121 | B2 | 1/2012 | Obermeyer et al. | |
| 8,957,859 | B2 | 2/2015 | Phan Le et al. | |
| 10,372,155 | B2 | 8/2019 | Wang et al. | |
| 11,416,074 | B1 * | 8/2022 | Trincia | G02B 1/045 |
| 11,614,805 | B2 | 3/2023 | Chen et al. | |
| 11,681,321 | B2 | 6/2023 | Huang et al. | |
| 2003/0098844 | A1 * | 5/2003 | Melnyk | G06F 3/0219 345/156 |
| 2005/0162389 | A1 * | 7/2005 | Obermeyer | G06F 3/0338 345/161 |
| 2006/0146020 | A1 | 7/2006 | Tu | |
| 2007/0035516 | A1 * | 2/2007 | Voto | G05G 9/047 345/161 |
| 2007/0126700 | A1 * | 6/2007 | Wright | G06F 3/0321 345/161 |
| 2008/0018600 | A1 | 1/2008 | Hou et al. | |
| 2009/0101802 | A1 | 4/2009 | Phan Le et al. | |
| 2009/0101803 | A1 | 4/2009 | Phan Le | |
| 2009/0163836 | A1 * | 6/2009 | Sliwa | A61N 7/02 601/1 |
| 2010/0046073 | A1 * | 2/2010 | Braun | G02B 23/2407 359/503 |
| 2012/0091369 | A1 * | 4/2012 | Astratov | A61B 18/201 250/492.1 |
| 2014/0071050 | A1 * | 3/2014 | Armstrong-Muntner | G06F 3/03547 345/158 |
| 2015/0220164 | A1 * | 8/2015 | Anderson | G06F 3/0338 345/156 |
| 2016/0157939 | A1 * | 6/2016 | Larkin | A61B 34/20 600/424 |
| 2017/0131846 | A1 * | 5/2017 | Huitema | G06F 3/0421 |
| 2018/0303383 | A1 * | 10/2018 | Connor | G06F 3/014 |
| 2023/0407593 | A1 * | 12/2023 | Noll | E02F 9/2004 |
| 2024/0200535 | A1 * | 6/2024 | Pathuvoth | F03D 17/013 |
| 2026/0007331 | A1 * | 1/2026 | Ristani | A61B 5/1126 |

* cited by examiner

CONTROLLERS AND SENSORS INCORPORATING OPTICAL FLEXION SENSORS

FIELD

The present technology is generally related to controllers and sensors which incorporate optical flexion sensors.

BACKGROUND

Controllers, such as joysticks, are widely used in both physical and virtual applications. For example, they facilitate user interaction with mechanical systems or software programs such as video games or simulation tools. These controllers typically employ electrical circuitry to convert mechanical motion into electrical signals that govern the operation of a mechanical apparatus or software application.

However, electrical circuitry may be vulnerable to malfunction or failure in certain environmental conditions. For example, exposure to radiation may degrade or impair circuit performance, and high humidity may result in corrosion, malfunctions, or failure. Although various design modifications and protective measures have been developed to address environmental challenges, these approaches often increase the complexity and cost of the controller design.

SUMMARY

The techniques of this disclosure generally relate to control members which incorporate optical flexion sensors, which may be constructed with low-cost materials and enable the use of the control members in harsh environments, e.g., environments in which there is a large amount of radiation or liquid harmful to electronics.

In one aspect, the disclosure provides a controller. The controller includes a base member, and a control member movably coupled to the base member. The controller also includes a first flexible light guide coupled between the control member and the base member, and a second flexible light guide coupled between the control member and the base member. The first and second flexible light guides may be configured to transmit light that varies in response to movement of the control member In aspects, implementations of the controller may include one or more of the following features. Each of the first and second flexible light guides may include a series of optical elements configured to direct or transmit light along the first and second flexible light guides. The optical elements may be spherical-shaped or semi-spherical-shaped optical elements configured to focus or redirect incident light. The optical elements may be made of plastic, glass, acrylic, polycarbonate, fused silica, or quartz. The optical elements may be arranged to maintain optical transmission during bending of the first and second flexible light guides.

In aspects, each of the first and second flexible light guides may include a flexible tube in which the optical elements are disposed. The flexible tube may be deformable in response to mechanical motion of the control member. The flexible tube may be made of polyvinyl chloride (PVC), silicone rubber, polyurethane (PU), a thermoplastic elastomer (TPE), or a fluoropolymer.

In aspects, the controller may include first and second light sources configured to direct light to a spherical optical element disposed at a first end portion of the first and second flexible light guides, respectively. The first and second light sources may be configured to emit light into the first and second flexible light guides along an optical axis. The first and second light sources may be laser diodes or light-emitting diodes (LEDs). In aspects, the first and second light sources may be configured to generate light of different wavelengths.

In aspects, the controller may include first and second light intensity sensors disposed at or near a second end portion of the first and second flexible light guides, respectively.

In aspects, the control member may be a control stick including a ball member configured to mate with a socket in which the ball member may rotate to enable multi-plane displacement or deflection of the control member.

In aspects, the controller may be a joystick, a control stick, a side stick, a game stick, a thumb stick, an analog stick, a manipulator stick, a control lever, or a hand controller.

In another aspect, the disclosure provides a method. The method includes receiving first light intensity data from a first light sensor configured to detect light transmitted through a first flexible light guide coupled to a movable member, and receiving second light intensity data from a second light sensor configured to detect light transmitted through a second flexible light guide coupled to the movable member. The method also includes determining position data of a movable member based on the first and second light intensity data and transmitting the position data of the movable member to an external system for control or feedback.

In aspects, implementations of the method may include one or more of the following features. The position data of the movable member may be transmitted to an apparatus to control operation of the apparatus. The apparatus may be a display, a robot, or a vehicle. The position data may be sensor data.

In another aspect, the disclosure provides a sensor system. The sensor system may include a base member, and a sensor member movably coupled to the base member. The sensor system may also include a first flexible light guide assembly coupled between the sensor member and the base member, the first flexible light guide assembly including a first flexible light guide and a first light sensor coupled to the first flexible light guide. The sensor system may also include a second flexible light guide coupled between the sensor member and the base member, the second flexible light guide assembly including a second flexible light guide and a second light sensor coupled to the second flexible light guide. The first and second flexible light guide assemblies are configured to detect displacement or deformation of the sensor member.

In aspects, implementations of the controller may include one or more of the following features. The sensor system may include a processor coupled to the first and second light sensors. The sensor system may include a memory having stored thereon instructions, which when executed by the processor, causes the processor to: receive light sensor data from the first and second light sensors, and determine position data of the sensor member based on the light sensor data.

In aspects, the sensor member may include a propulsive surface.

In aspects, the sensor member may be an airfoil, a hydrofoil, a sail, a rotor, a rudder, or at least one fin.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 4 is a flow chart that illustrates a method for use with the system of FIG. 3.

FIG. 7 is a perspective view of an example of a sensor that illustrates a sensor element incorporated into features of the controller of FIGS. 1A and 1B.

DETAILED DESCRIPTION

The disclosure relates to controllers and sensors incorporating optical flexion sensors, which are resilient in many environments. As described herein, the controller configurations may easily be reconfigured as sensors for various sensor applications. The controller may include a base member, a control member coupled to the base member, a first flexible light guide coupled between the control member and the base member, and a second flexible light guide coupled between the control member and the base member. The flexible light guides are coupled to the control member and the base member so as to sense at least one-dimensional motion of the control member. In aspects, the control member may be replaced with a force sensor member. The force sensor member may be configured to deflect when a fluid such as air or water impinges on the force sensor member. The disclosure presents various example aspects of controllers and sensors.

Figure 1A:
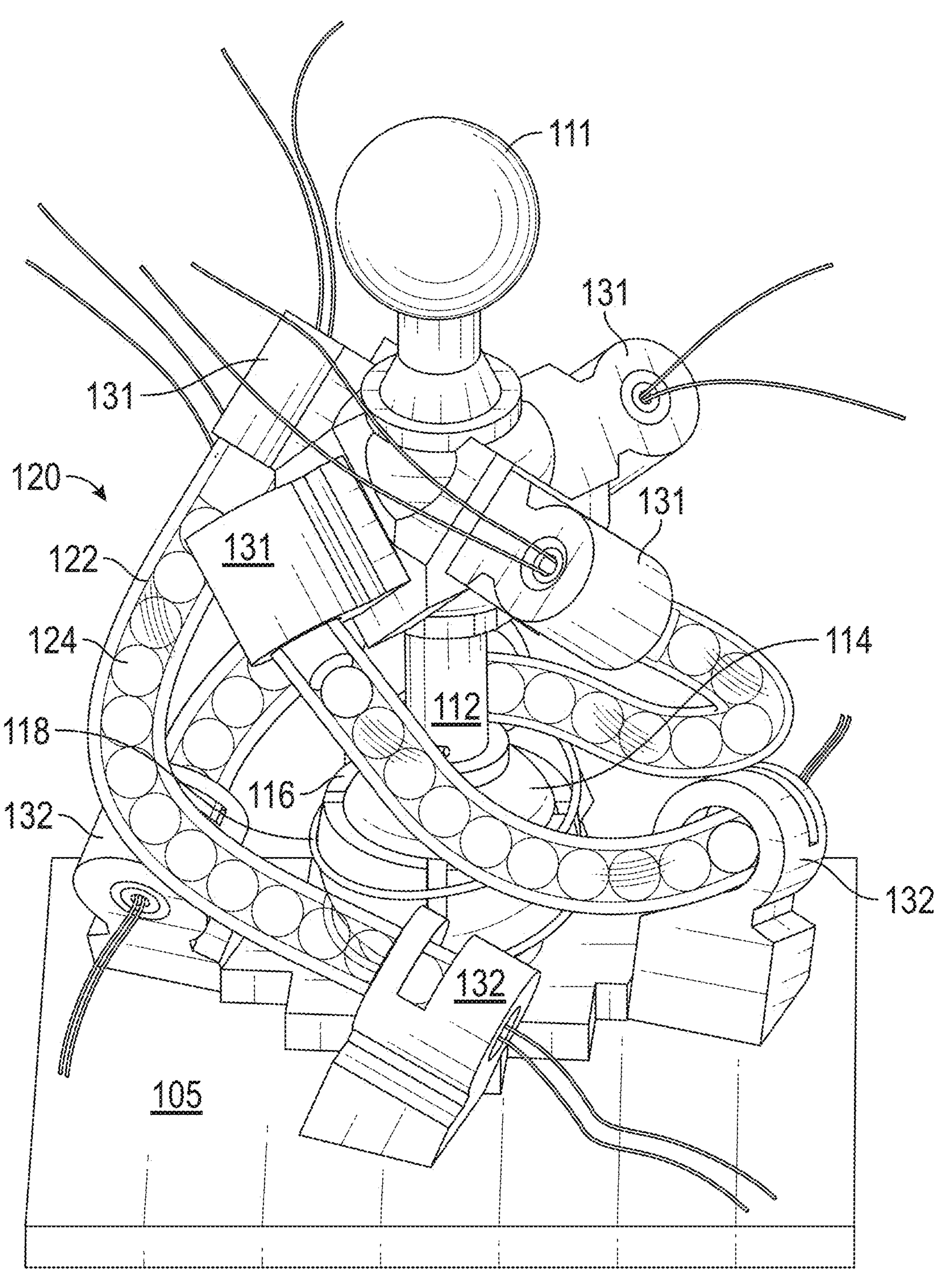
FIG. 1A is a perspective view of a controller that illustrates optical sensor assemblies for sensing the position of the handle.

FIG. 1A is an example of a controller according to aspects of the disclosure. The controller includes a handle 111 which is coupled to a stick 112. The stick 112, in turn, is coupled to a ball 114, which fits within a socket 116. The ball 114 and the socket 116 form a joint that allows the handle and stick to rotate in all directions. The socket 116 may be coupled to a base 105, which may provide a stable platform for operating the controller.

In some aspects, the controller may include a spring 118 coiled around the joint formed by the ball 114 and socket 116. The spring 118 may be attached at one end to the stick 112 and at the other end to the base 105 and/or socket 116. The spring 118 may be configured to bias the stick 112 toward a neutral position when moved by a user. In this manner, the spring 118 may assist in returning the control member to a centered position, thereby improving responsiveness and user control.

In other aspects, alternative biasing mechanisms may be used in place of the spring 118. For example, the controller may incorporate an elastic member, a torsional spring, a resilient dome structure, a flexural element, or a compliant mechanism formed of a flexible material. The flexible material may include an elastomeric substance (e.g., silicone or rubber), or a thin metal or plastic having elastic memory. These alternatives may be configured to apply a restoring force that returns the stick 112 to a neutral or home position following displacement.

In aspects, the ball 114 and socket 116 may be replaced with another suitable apparatus that allows the handle and stick to move with respect to a stationary base 105. For example, the ball 114 and the socket 116 may be replaced by a conical spring, which may be coupled between the lower portion of the stick 112 and the base 105.

The controller may include multiple upper holding members 131 and multiple corresponding lower holding members 132. An optical flexion sensor 120 is coupled between each pair of upper and lower holding members 131, 132. In aspects, the upper holding members 131 may be coupled to an upper portion of the stick 112. And the lower holding members 132 may be coupled to the base 105. In aspects, the upper and lower holding members 131, 132 may be configured at an angle to optimize the sensing function of the optical flexion sensor 120. For example, the angle of the upper and lower holding members 131, 132 may be configured to allow for uniform bending or deflection of the optical flexion sensor 120. In aspects, the angle of the upper and lower holding members 131, 132 may be configured such that the optical flexion sensors 120 do not interfere with each other during operation of the controller.

In aspects, the upper holding members 131 may enclose or house a light source (not shown) at one end of the optical flexion sensor 120 and the lower holding members 132 may enclose or house a light sensor (not shown) at the other end of the optical flexion sensor 120. Alternatively, the upper holding members 131 may enclose or house a light sensor (not shown) at one end of the optical flexion sensor 120 and the lower holding members 132 may enclose or house a light source (not shown) at the other end of the optical flexion sensor 120.

As illustrated in FIG. 1A, each of the upper and lower holding members 131, 132 may include an aperture through which light source and light sensor wires may pass so that they may be connected to a computer and/or electronic circuitry (not shown). In aspects, the controller may include various apparatuses or systems to manage or organize the wires. In some aspects, the wires for the light sensors (not shown) may be replaced with wireless transceivers, which may be configured to communicate with the computer and/or electronic circuitry.

The example controller illustrated in FIG. 1A shows the use of four optical flexion sensors 120. Alternatively, the controller may include fewer than or more than four optical flexion sensors 120. For example, the controller may include three optical flexion sensors 120. In that case, the controller may include upper holding members 131 that are equidistant from each other lower holding members 132 that are equidistant from each other. In other words, the upper holding members 131 may be 120° apart and the lower holding members 131 may be 120° apart. For the controller including three optical flexion sensors 120, two of the upper holding members 131 may be 90° apart and two of the lower holding members 131 may be 90° apart. As another example, the controller may include two optical flexion sensors 120. In that case, the controller may include upper holding members 131 that are 90° apart and lower holding members 131 that are 90° apart.

In some aspects, each optical flexion sensor 120 may be replaced by two optical flexion sensors arranged in parallel. The two optical flexion sensors may be arranged such that the light source of one optical flexion sensor is placed adjacent to the light sensor of the other optical flexion sensor. The length of the optical flexion sensor 120 may also be adjusted to increase the sensitivity at both ends of the optical flexion sensor 120. Preliminary experimentation has demonstrated that making the optical flexion sensor 120 longer increases sensitivity at both ends of the optical flexion sensor 120.

Each of the optical flexion sensors 120 may include a tubular structure 122 in which optical spherical elements 124 are arranged in a series. The tubular structure 122 may include any number of optical spherical elements 124. For example, each optical flexion sensor 120 may include between 10 and 20 optical spherical elements 124 although other quantities may also be used. In other examples, each optical flexion sensor 120 may include less than 10 optical spherical elements 124. For example, each optical flexion sensor 120 may include between 3 and 9 optical spherical elements 124.

The tubular structure 122 may be very flexible to enable the optical flexion sensor 120 to easily bend and twist in any direction. The tubular structure 122 may be made of a polymer, silicon, rubber, or metal material depending on the application and the severity of the environment in which the controller and/or sensor is used. For example, in the case where the controller and/or sensor is used in a space application (e.g., exploring the surface of a planet or on a nano satellite), the tubular structure 122 may be made of a woven material, e.g., a mesh, to withstand the harsh environments of space applications including high intensity radiation. The mesh may be made of a metal or polymer material.

Figure 2A:
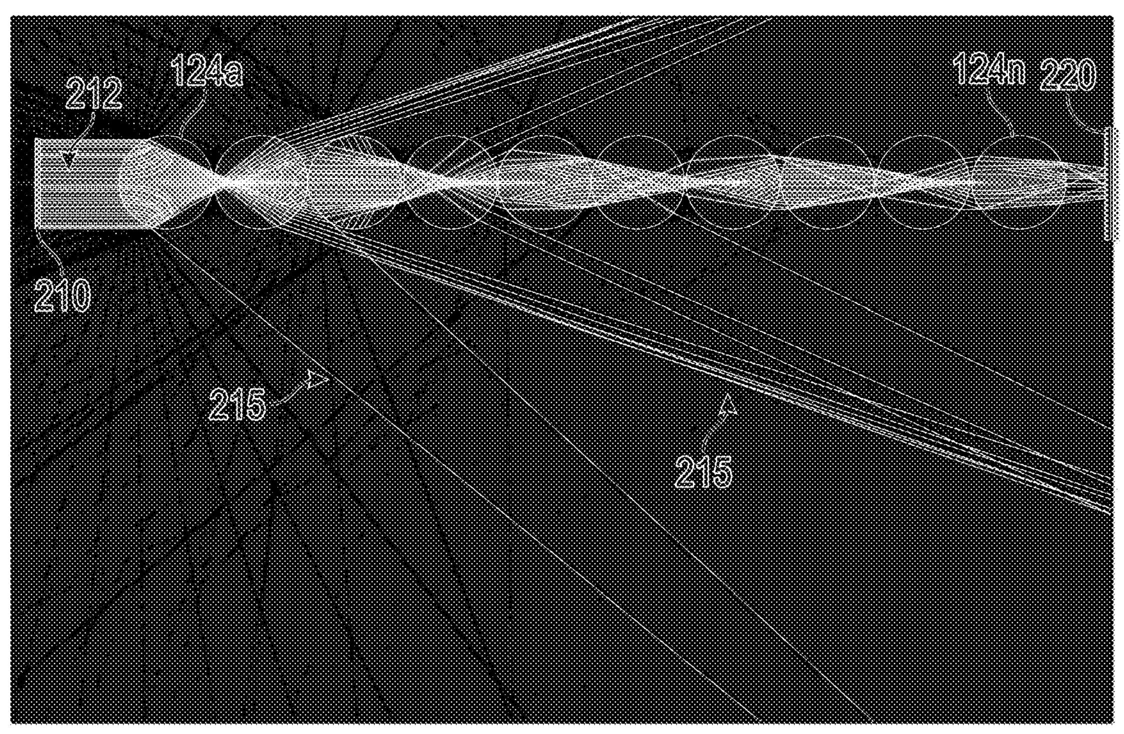
FIG. 2A is an optical diagram that illustrates the transmission of light through an optical sensor assembly in a straight state.
Figure 2B:
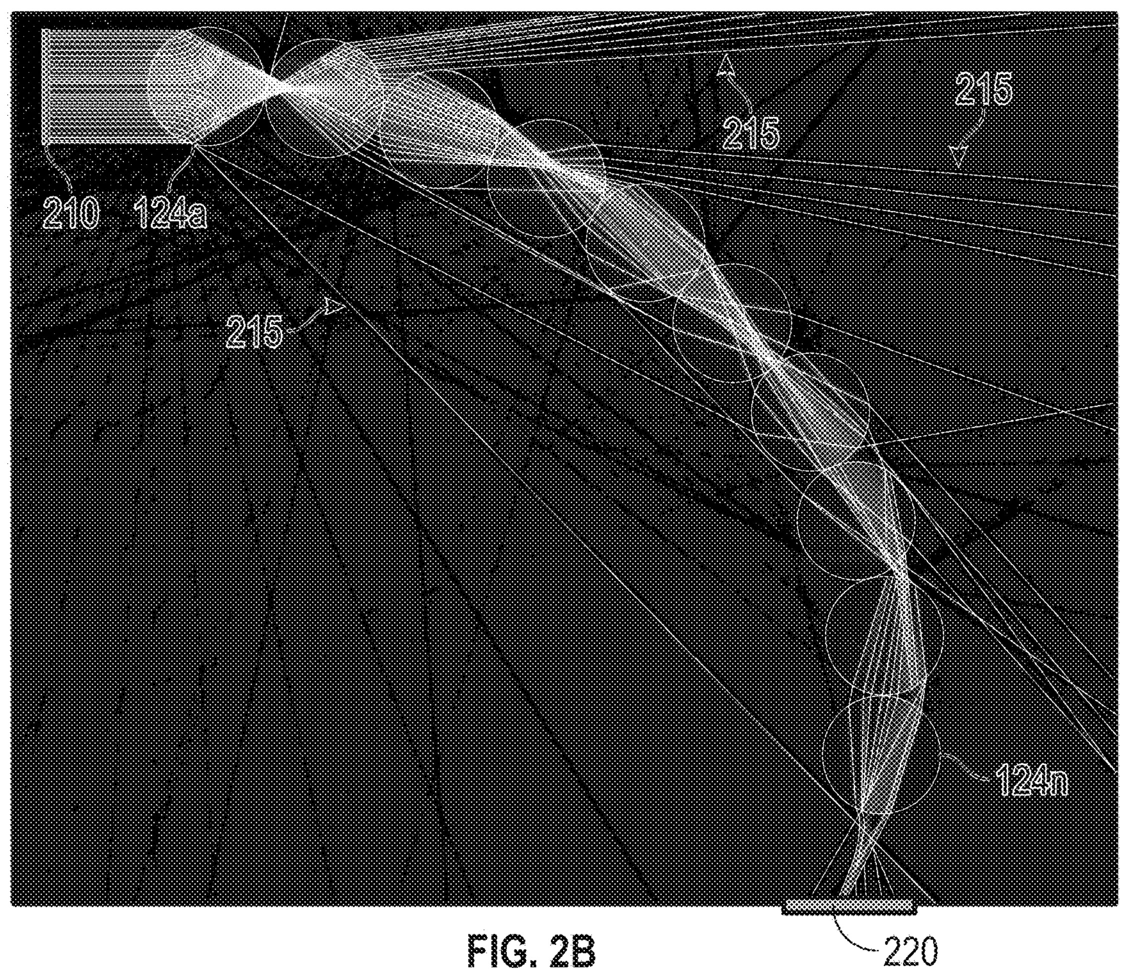
FIG. 2B is an optical diagram that illustrates the transmission of light through the optical sensor assembly of FIG. 2A in a bent state.

FIGS. 2A and 2B illustrate the structure and operation of an optical flexion sensor assembly. The optical flexion sensor assembly may include a tubular structure 122 containing a series of spherical lenses 124*a*-124*n* extending from one end to the other end of the tubular structure 122. The spherical lenses 124*a*-124*n* may be glass spheres, which may or may not be optical-grade glass spheres. One end of the tubular structure 122 may be optically coupled to a light source 210, and the other end of the tubular structure 122 may be optically coupled to a light sensor 220. In aspects, the light source 210 may be directed toward an initial spherical lens to optimize the coupling of light into the optical flexion sensor.

In aspects, the light source 210 may be a laser diode (e.g., similar to a laser used in pointer devices), a light-emitting diode (LED), or a Vertical-Cavity Surface-Emitting Laser (VCSEL). The light sensor 220 may be a light-dependent resistor (LDR) or another suitable photodetector. The optical flexion sensor assembly may be constructed using inexpensive, off-the-shelf, and/or readily available components. For example, the light source 210 may be a commercially available LED, and the light sensor 220 may be a low-cost LDR.

In some aspects, the light source 210 may be configured to emit light of different wavelengths, such as two or more different wavelengths within the visible and/or infrared light spectrum. A microcontroller may be configured to control the light source 210 to switch among the different wavelengths depending on the environment conditions, specific application requirements, or user-defined settings.

In aspects, the tubular structure 122 may be transparent, e.g., for aesthetic reasons. Alternatively, the tubular structure 122 may be partially or completely opaque. The tubular structure 122 may be any color or any combination of colors. In aspects, the tubular structure 122 may be made of a metallic or plastic coiled spring. The tubular structure 122 may be made of any material suitable for bending or flexing. The material may be made of metallic, plastic, synthetic, and/or natural material. For example, the material may be metallic, plastic, synthetic, and/or natural fibers or strands woven together to form the tubular structure 122.

In aspects, the spherical lenses 124*a*-124*n* may not restrict the flexion of the tubular structure 122 to any significant degree. The diameter of the spherical lenses 124*a*-124*n* may be approximately a diameter of the tubular structure 122. The spherical lenses 124*a*-124*n* may be glass spheres, which may or may not be optical-grade glass depending on whether minimal cost is a priority.

The light source 210 and the light sensor 220 may be any type and any wavelength. For example, the light source 210 may be an off-the-shelf light-emitting diode (LED) and the light sensor 220 may be an off-the-shelf light-dependent resistor or light sensor. The light source 210 may be configured to generate light of different wavelengths. In aspects, the different available wavelengths of light may allow the user to modify the color of the light in an optical flexion sensor 120. The lights source 210 may be configured to generate light having a wavelength optimized for transmission by the lens elements and or detection by the light sensor 220.

As illustrated in FIGS. 2A and 2B, when the spherical lenses 124*a*-124*n* are in a straight row, the light 212 from the light source 210 passes through the spherical lenses 124*a*-124*n*. The ratio of the amount of light 215 escaping the spherical lenses 124*a*-124*n* on the way to the light sensor 220 compared to the amount of light 212 propagating through the spherical lenses 124*a*-124*n* may vary depending on the design and/or use of the optical flexion sensor. The spherical lenses 124*a*-124*n* may be arranged within the tubular structure 122 such that the spherical lenses 124*a*-124*n* maintain optical transmission through the light guide, even during substantial bending or deflection of the optical flexion sensor.

For example, when the optical flexion sensor is moderately bent—e.g., to angles of approximately 90°—some light 215 may be transmitted outside of the series of spherical lenses 124*a*-124*n* on the way to the light sensor 220, while a substantial portion of light 212 continues to propagate through the spherical lenses 124*a*-124*n*. When the optical flexion sensor is significantly bent—e.g., to angles approaching 180°—a greater proportion of light 215 may be transmitted outside of the spherical lenses 124*a*-124*n*, while a certain amount of light (e.g., a residual portion) may still propagate through the distal spherical lenses 124*n* and may be detected by the light sensor 220.

The optical flexion sensor is suitable for a variety of applications where measuring mechanical deformation is desired. As the optical flexion sensor bends, the intensity of light reaching the light sensor 220 decreases, enabling measurement of the magnitude of the deformation. While a single optical flexion sensor can measure the magnitude of deformation in multiple directions, it does not inherently measure the direction of bending. Accordingly, in some aspects, two or more optical flexion sensors are employed to measure the direction of bending in two-dimensional or three-dimensional space.

In aspects, the useful length, e.g., the maximum useful length, of the optical flexion sensor assembly may depend on a variety of parameters including one or more characteristics of the light source 210 and the quality of the spherical lenses

124a-124n. Optimal or desired optical sensitivity of the optical flexion sensor assembly may be determined experimentally. For example, some experimentation has demonstrated that a significant amount of the light 212 is easily detected by the light sensor 220 even when the tubular structure 122 and thus the spherical lenses 124a-124n are bent to a large angle, e.g., 180°.

The path of the light propagating through the spherical lenses 124a-124n may follow a pattern, which may be defined by a mathematical expression. In aspects, the pattern of diffusion and focusing may repeat at least every two lenses. For example, the pattern of diffusion and focusing may repeat approximately every three lenses. Although other patterns may be observed and utilized in designing a controller, sensor, or light guide assemblies. The bending of the tubular structure 122 results in eventual concentration of the transmitted light in the greater curvature of the bent tube (which can be used later to place in theory two sensors and relative light received in each can then tell which way the tube is bent in two-dimensional plane).

The use of spherical lenses may be advantageous in that every pair of spherical lenses may diffuse and reconcentrate the light in a predictable way, and in the process transmit a large portion of the light despite the bent state of the optical flexion sensor, which causes some of the light to be transmitted outside of the optical flexion sensor. This allows for the detection of the signal and also a change in the intensity of the light that corresponds with the degree of the bend of the optical flexion sensor. Spherical lenses are also advantageous as they allow for easy bending of the optical flexion sensor.

The operational length of the optical flexion sensor may vary based on factors such as the quality of the optical lenses and the intensity of the light source 210. For example, a high-intensity laser diode may enable longer optical flexion sensor configurations, even when standard light sensors are employed. Practical implementations have demonstrated that effective optical flexion sensor lengths may range from approximately five to thirty centimeters or more, depending on the specific requirements and constraints of the application. It should be understood that this range is provided by way of example, and that shorter or longer sensor lengths may be employed depending on the application.

Figure 3:
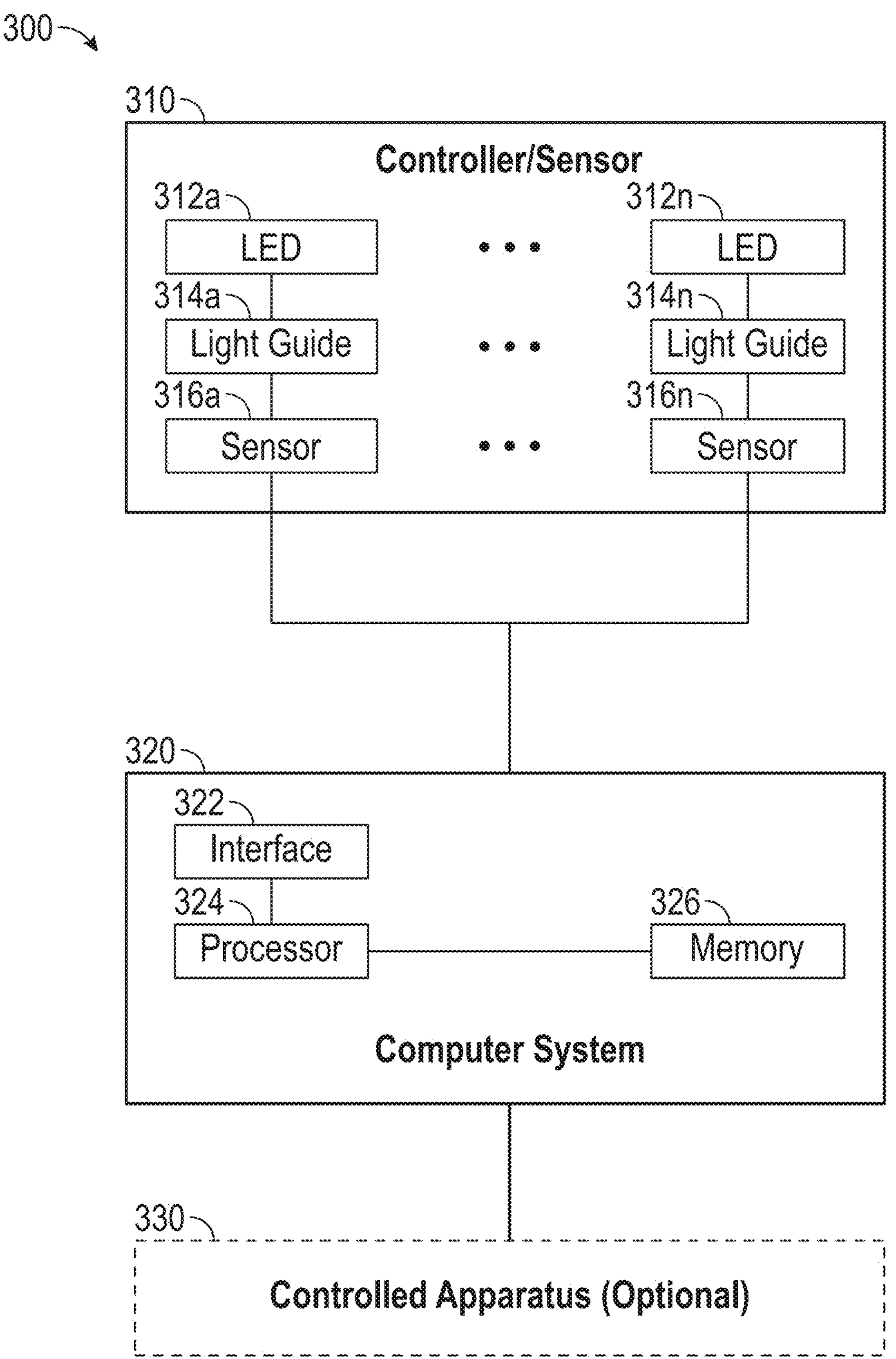
FIG. 3 is a circuit block diagram that illustrates an example of a system incorporating a controller or sensor according to aspects of this disclosure.

FIG. 3 illustrates a system architecture 300 according to aspects of the disclosure. The system architecture 300 includes a controller or sensor 310, a computer system 320, and an optional controlled apparatus 330. The controller or sensor 310 includes LEDs 312a-312n, light guides 314a-314n optically coupled to respective LEDs 312a-312n, and light sensors 316a-316n optically coupled to respective light guides 314a-314n. The controller or sensor 310 is in communication with the computer system 320. In aspects, the controller or sensor 310 may be coupled to the computer system 320 via a wired or wireless communication connection.

The computer system 300 may include an interface 322, a processor 324 coupled to the interface 322, and a memory 326 coupled to the processor 324. The computer system 320 may communicate with the controller or sensor 310 via the interface 322. The memory 326 may store software instructions that, when executed by the processor 324, may cause the processor 324 to acquire or receive sensor data from the sensors 316a-316n and calculate the position of the controller or sensor 310 based on the received sensor data. For example, the memory 326 may store software instructions that, when executed by the processor 324, may cause the processor 324 to perform data acquisition from the sensors 316a-316n and compute positional information based on light intensity values acquired from the sensors 316a-316n.

In certain implementations, the sensor data generated by the optical flexion sensors may be processed by a microcontroller, such as a low-power microcontroller, which may be implemented using an off-the-shelf processor (e.g., an Arduino board or other suitable embedded platform). The microcontroller may be programmed to continuously read analog voltage values from each of the light sensors 220, which are optically coupled to the ends of respective optical flexion sensor assemblies. These analog voltage values represent light intensity measurements corresponding to the degree of bending or deformation of the optical flexion sensors.

The measured analog voltage values may then be used to calculate directional deflection of a movable member, such as a control stick in a controller system or a sensing surface in a sensor system. For example, in a configuration using four optical flexion sensors, the microcontroller may mathematically combine outputs from opposing pairs of optical flexion sensors to determine values corresponding to orthogonal directional components (e.g., azimuth and altitude). In some aspects, one or more of the light sensor outputs may be scaled to account for sensor variability or to normalize the voltage values. These calculated deflection values may then be linearly mapped to a constrained output range suitable for controlling actuators, such as servo motors, which adjust their position in response to the calculated deflection values.

The processing algorithm may incorporate weighting factors to emphasize or attenuate specific optical flexion sensor outputs, thereby enabling more refined directional control or sensing based on the relative bending of the optical flexion sensors. To ensure consistent operation across various lighting conditions or light sensor tolerances, the processing algorithm may constrain the incoming light sensor voltage values within predefined thresholds and may apply gain adjustments or offset corrections. Once the deflection values are calculated, they may be converted into control signals using pulse-width modulation (PWM) or another suitable signal generation technique. These signals may then be used to drive connected devices such as video displays, turret systems, robotic arms, or other electromechanical systems. This approach enables a low-cost, adaptable, and resilient sensing or control platform capable of functioning in a wide range of environments and applications.

In aspects, a controller or sensor may employ two or more optical flexion sensors arranged in a parallel, radial, or other spatial configuration suitable for detecting direction and magnitude of deflection of a controller or sensor stick or arm. The optical flexion sensors may be distributed around a central axis, mounted in a polygonal pattern, or embedded along flexible structures such as wearable devices, masts, or robotic limbs. The relative differences in light intensity measured by the optical flexion sensors may be analyzed and mapped to a coordinate space-such as a two-dimensional or three-dimensional vector field-using algorithms configured to estimate the magnitude and/or direction of deformation. These optical flexion sensor configurations may enable multi-directional sensing, allowing the system to estimate both the magnitude and direction of bending forces applied to a structure.

In the case of a controller or sensor employing four optical flexion sensors, position information may be calculated for each plane (e.g., an amplitude plane and an azimuth plane) based on sensor data from the four sensors. First, the directions of the controller or sensor stick deflection that result in the most significant flexion of one of the optical flexion sensors is identified. The flexion of opposite optical flexion sensors on a first plane is at 90 degrees to each other. In these positions, one optical flexion sensor is much more bent than the opposing optical flexion sensor and the remaining two optical flexion sensors are relatively straight. For the first plane (e.g., the azimuth plane), the computer system 320 retrieves the sensor data from the four optical flexion sensors and calculates a single value for the first plane based on the retrieved sensor data from the four optical flexion sensors. Then, for the second plane (e.g., the altitude plane), the computer system 320 retrieves the sensor data from the four optical flexion sensors and calculates a single value for the second plane based on the retrieved sensor data from the four optical flexion sensors.

The calculation of the single value for the azimuth and altitude planes may be performed using any suitable method. According to one example method, for each plane, a sum of sensor values from a pair of optical flexion sensors is subtracted from a sum of sensor values from the other pair of optical flexion sensors. A multiplier may be used to enhance the "weight" of the most deflected optical flexion sensor in each direction. In aspects, for each plane (e.g., the azimuth plane and the altitude plane), the two sensor values at ends of a plane are summed, and one sum is subtracted from the other. For the azimuth plane, the calculation may be expressed, for example, as ((a*L1)+(b*L4))−((c*L2)+(d*L3)), where L1 and L3 are sensor data values from the optical flexion sensors on the azimuth plane, L2 and L4 are sensor data values from the optical flexion sensors on the altitude plane, and a, b, c, and d are weights for each corresponding optical flexion sensor value. For the altitude plane, the calculation may be expressed, for example, as ((a*L3)+(b*L4))−((c*L1)+(d*L2)).

According to another example method, the ratio of the sums of sensor values from two optical flexion sensors at "ends" of a plane are determined, and the ratios are multiplied by a large weight to have a "nice" integer. For the azimuth plane, the calculation may be expressed, for example, as X*((a*L1)+(b*L4))/((c*L2)+(d*L3)), where X is a large weight relative to weights a, b, c, and d. In one example, the weights X, a, b, c, and d may be 90, 1, 2, 1, and 2, respectively, for the azimuth plane. For the altitude plane, the calculation may be expressed, for example, as Y*((a*L3)+(b*L4))/((c*L1)+(d*L2)), where Y is a large weight relative to weights a, b, c, and d. In one example, the weights Y, a, b, c, and d may be 100, 2, 1, 2, and 1, respectively, for the altitude plane.

According to still another example method, for any optical flexion sensor, a delta of each sensor data value from a number that is higher than the maximal value for any optical flexion sensor may be obtained. For the azimuth plane, the calculation may be expressed, for example, as Z−([(a*(max V−L4))+(b*(maxV−L1))]−[(c*(max V−L2))+(d*(maxV−L3))]), where Z is a large coefficient relative to weights a, b, c, and d, and max V is the maximum value for the optical flexion sensors. In one example, Z, max V, a, b, c, and d may be 2000, 650, 3, 2, 3, and 2, respectively, for the azimuth plane. For the altitude plane, the calculation may be expressed, for example, as Z−([(a*(max V−L3))+(b*(maxV−L4))]−[(c*(maxV−L1))+(d*(maxV−L2))]), where Z is a large coefficient relative to weights a, b, c, and d, and max Vis the maximum value for the optical flexion sensors. In one example, Z, maxV, a, b, c, and d may be 2000, 650, 3, 2, 3, and 2, respectively, for the altitude plane. After the azimuth and altitude planes are isolated and values are calculated, values from each plane is then mapped onto a corresponding servo. The above-described methods and settings are provided by way of example and are not intended to be limiting.

Figure 4:
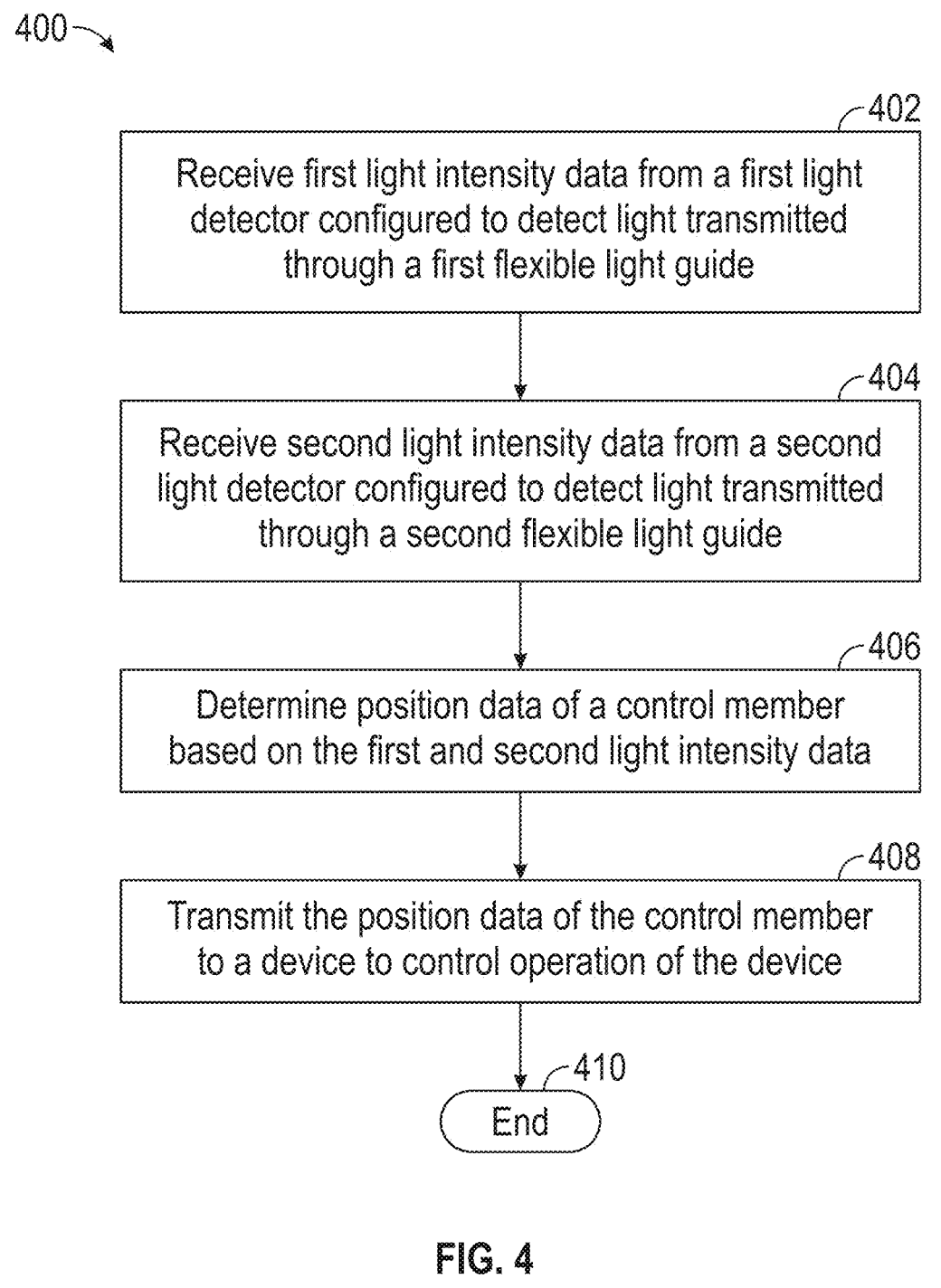

FIG. 4 illustrates a method 400 that may be used in conjunction with a controller or sensor according to aspects of the disclosure. The method 400 may be performed by any suitable processor such as a microprocessor or a digital signal processor. The method 400 may include receiving first light intensity data from a first light sensor configured to detect light transmitted through a first flexible light guide, at block 402. Similarly, at block 404, second light intensity data is received from a second light sensor configured to detect light transmitted through a second flexible light guide. At block 406, position data of a control or sensor member is determined based on the first and second light intensity data. Then, before ending at block 410, the position data of the control member is transmitted to a device to control operation of the device, at block 408. For example, the device may be a turret system that is configured to launch projectiles.

Figure 5A:
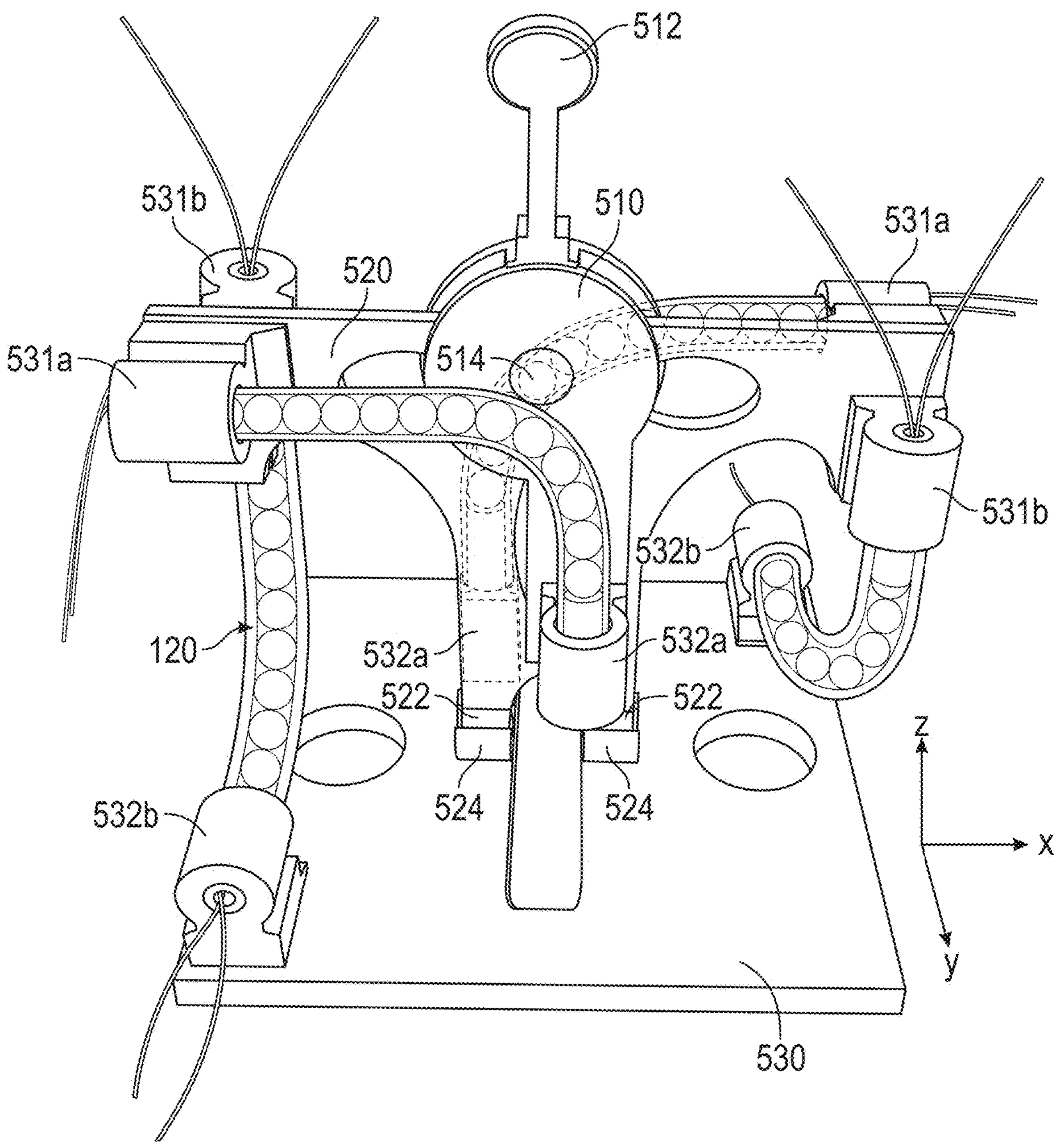
FIGS. 5A and 5B are perspective view of another example of a controller according to aspects of this disclosure.

FIG. 5A is another example of a controller according to aspects of the disclosure. The controller includes a handle 512 which is coupled to a first stick portion 510. The first stick portion 510, in turn, is rotatably coupled to a second stick portion 520 via an axis member 514. The second stick portion 520 includes ball members 522, which fit within respective socket members 524. The ball members 522 and respective socket members 524 form joints that allow the second stick portion 520 to rotate at one end about an x-axis, thereby enabling the handle 512 to move in the yz-plane. The socket members 524 may be coupled to a base 530, which may provide a stable platform for operating the controller. In aspects, the ball members 522 and socket members 524 may be replaced with another suitable apparatus that allows the handle 512 to move with respect to a stationary base 530. For example, the ball members 522 and the socket members 524 may be replaced by a compliant mechanism, e.g., a flexible material that allows the handle 512 to move only in the yz-plane.

The controller may include multiple upper holding members 531*a*, 531*b* and multiple corresponding lower holding members 532*a*, 532*b*. An optical flexion sensor 120 is coupled between each pair of upper and lower holding members 531*a*, 531*b*, 532*a*, 532*b*. In aspects, the upper holding members 531*a*, 531*b* may be coupled to an upper portion of the second stick portion 520. The lower holding members 532*a* holding one end of the optical flexion sensors 120 arranged in the xz-plane may be coupled to the lower portion of the first stick portion 510. And the lower holding members 532*b* holding one end of the optical flexion sensors 120 arranged in the yz-plane may be coupled to the base 530.

In the initial, resting state of the example controller illustrated in FIG. 5A, the upper holding members 531*a* are arranged in the x-direction, the lower holding members 532*b* are arranged in the y-direction, and the remaining holding members 531*b*, 532*a* are arranged in the z-direction. In aspects, the upper and lower holding members 531*a*, 531*b*, 532*a*, 532*b* may be configured at different angles to optimize the sensing function of the optical flexion sensor 120. For example, the angle of the upper and lower holding members 131, 132 may be configured to allow for uniform bending or deflection of the optical flexion sensor 120.

In aspects, the upper holding members 531*a*, 531*b* may enclose or house a light source (not shown) at one end of the optical flexion sensor 120 and the lower holding members 532*a*, 532*b* may enclose or house a light sensor (not shown) at the other end of the optical flexion sensor 120. Alternatively, the upper holding members 531*a*, 531*b* may enclose or house a light sensor (not shown) at one end of the optical flexion sensor 120 and the lower holding members 531*a*, 531*b* may enclose or house a light source (not shown) at the other end of the optical flexion sensor 120.

As illustrated in FIG. 5A, each of the upper and lower holding members 531*a*, 531*b*, 532*a*, 532*b* may include an aperture through which light source and light sensor wires may pass so that they may be connected to a computer and/or electronic circuitry (not shown). In aspects, the controller may include various apparatuses or systems to manage or organize the wires. In some aspects, the wires for the light sensors (not shown) may be replaced with wireless transceivers, which may be configured to communicate with the computer and/or electronic circuitry.

The example controller illustrated in FIG. 5A shows the use of four optical flexion sensors 120. Alternatively, the controller may include fewer than or more than 4 optical flexion sensors 120. For example, the controller may include two optical flexion sensors 120. In that case, the controller may include only one upper holding member 531*a*, only one upper holding members 531*b*, only one upper holding member 532*a*, and only one upper holding members 532*b*.

In some aspects, each optical flexion sensor 120 may be replaced by two optical flexion sensors arranged in parallel. The two optical flexion sensors may be arranged such that the light source of one optical flexion sensor is placed adjacent to the light sensor of the other optical flexion sensor. The length of the optical flexion sensor 120 may also be adjusted to increase the sensitivity at both ends of the optical flexion sensor 120. Preliminary experimentation has demonstrated that making the optical flexion sensor 120 longer increases sensitivity at both ends of the optical flexion sensor 120.

Figure 5B:
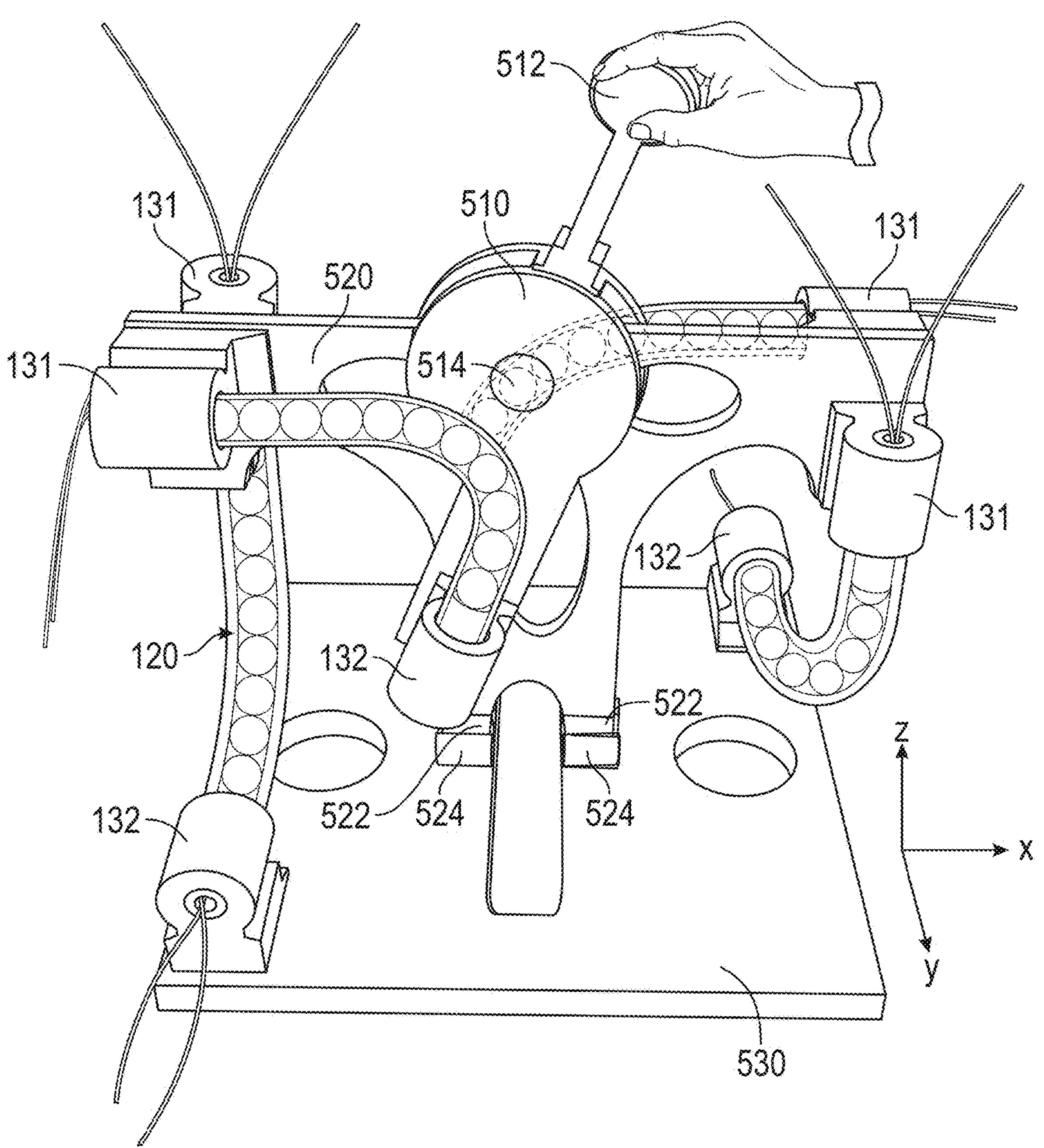

As illustrated by FIGS. 5A and 5B, when a user manipulates the handle in the xz-plane, one optical flexion sensor 120 arranged in the xz-plane is bent to an acute angle, the other optical flexion sensor 120 arranged in the xz-plane is bent to an obtuse angle, and the optical flexion sensors 120 arranged in the yz-plane remain at a right angle. As described herein, the optical flexion sensors may be arranged at different initial or resting angles.

Figure 6A:
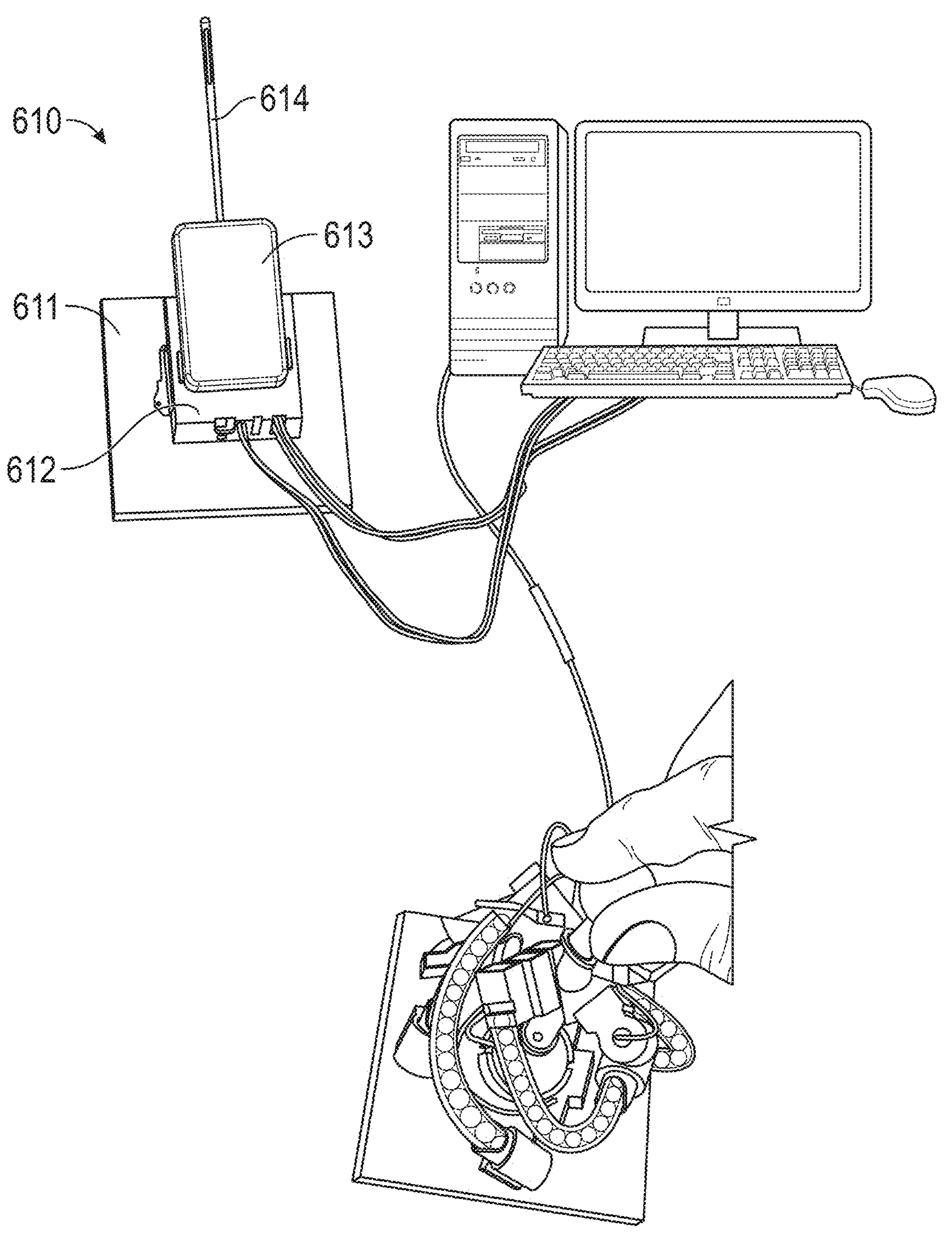
FIG. 6A-6D are perspective views of an example of a controller used to control a turret system.

As described herein, the controller or sensor of the disclosure may be used in a variety of applications or systems. One such system is a robotic system. An example of a robotic system is a turret system is illustrated in FIGS. 6A-6D. As illustrated in FIG. 6A, a turret system 610 includes a main base 611, a first movable platform 612, a second movable platform 613, and a muzzle 614. The first movable platform 612 may be rotationally coupled to the main base 611 via an electric motor. And the second movable platform 613 may be rotationally coupled to the second movable platform 612 via a servo motor (e.g., servo motor 615 illustrated in FIG. 6D) in a plane perpendicular to the plane in which the first movable platform 612 rotates.

Figure 6B:
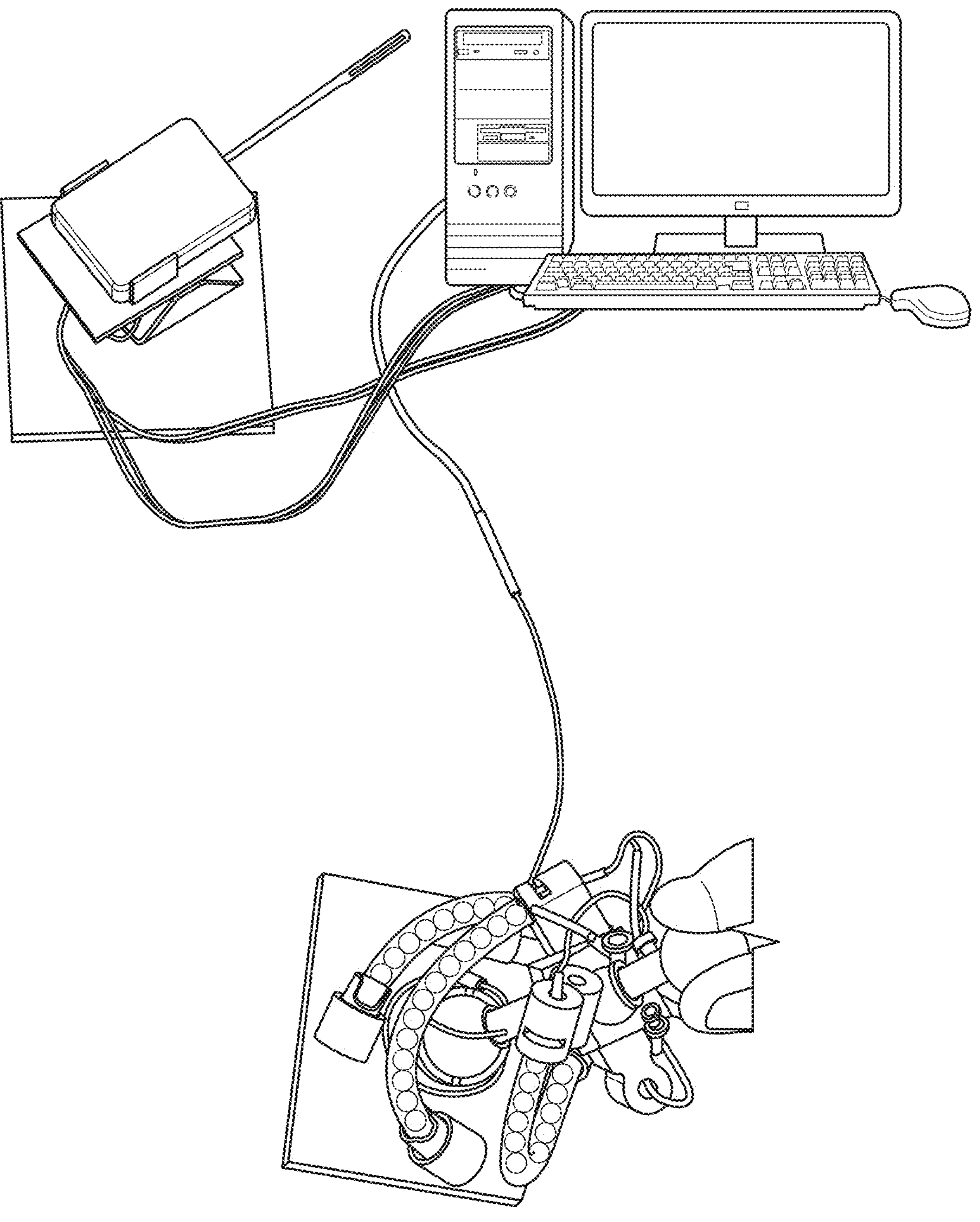
Figure 6C:
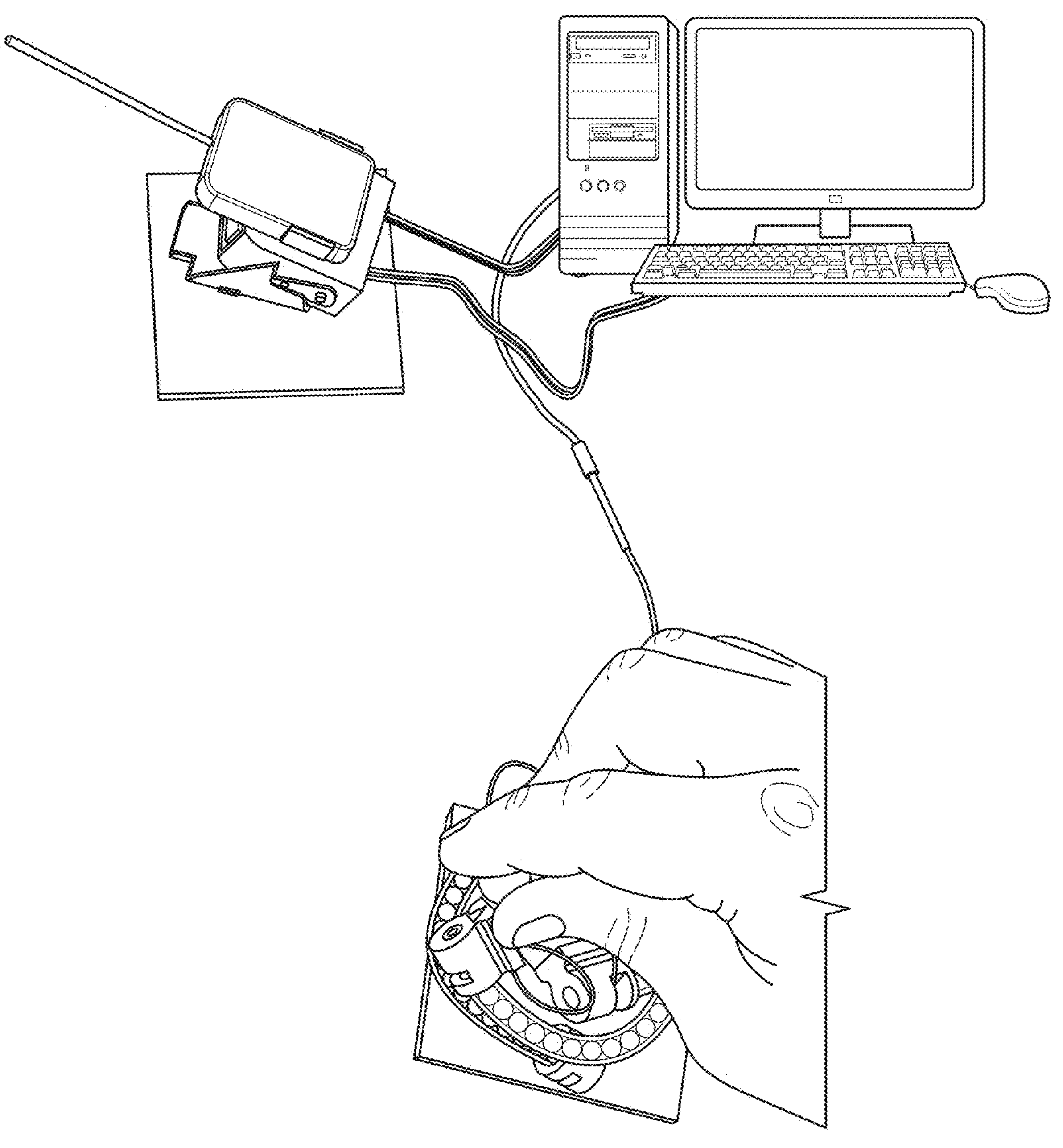

The controller and the turret system 610 may be in communication with a computer via electrical wires. The computer may receive the controller movement signals, process the controller movement signals, and transmit movement commands to the turret system 610 in order to move the movable platforms 612, 613 to desired positions. As illustrated in FIG. 6B, the indicated movement of the control stick by a user (to the right and up) causes the first movable platform 612 to rotate to the right and causes the second movable platform 613 to point the muzzle 614 in a nearly horizontal direction. As further illustrated in FIG. 6C, the indicated movement of the control stick by a user (to the left and up) causes the first movable platform 612 to rotate to the left and causes the second movable platform 613 to point the muzzle 614 at a greater angle with respect to the horizontal direction.

Figure 6D:
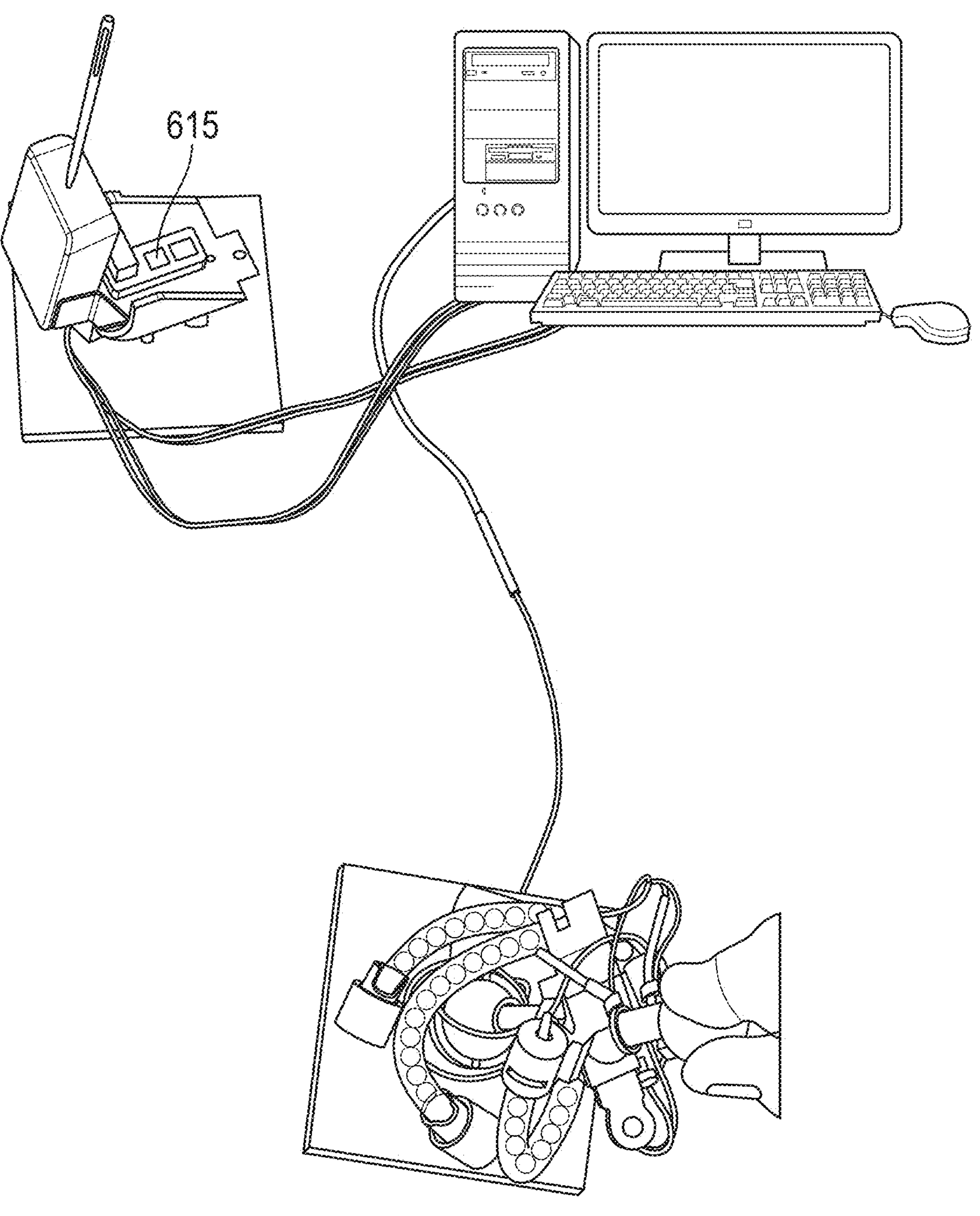

As still further illustrated in FIG. 6D, the indicated movement of the control stick by a user (to the right and down) causes the first movable platform 612 to rotate to the left and causes the second movable platform 613 to point the muzzle 614 in a nearly vertical direction. Although not illustrated in FIGS. 6A-6D, movement of the control stick by a user to the left and down may cause the first movable platform 612 to rotate to the left and may cause the second movable platform 613 to point the muzzle 614 in a nearly vertical direction. In this example, the movement of the controller and the corresponding movement of the turret system relate intuitively to the effect of moving a control stick in an airplane. In other aspects, however, the computer may be programmed to cause the first and second platforms 612, 613 to move in directions different from the directions described above.

Figure 1B:
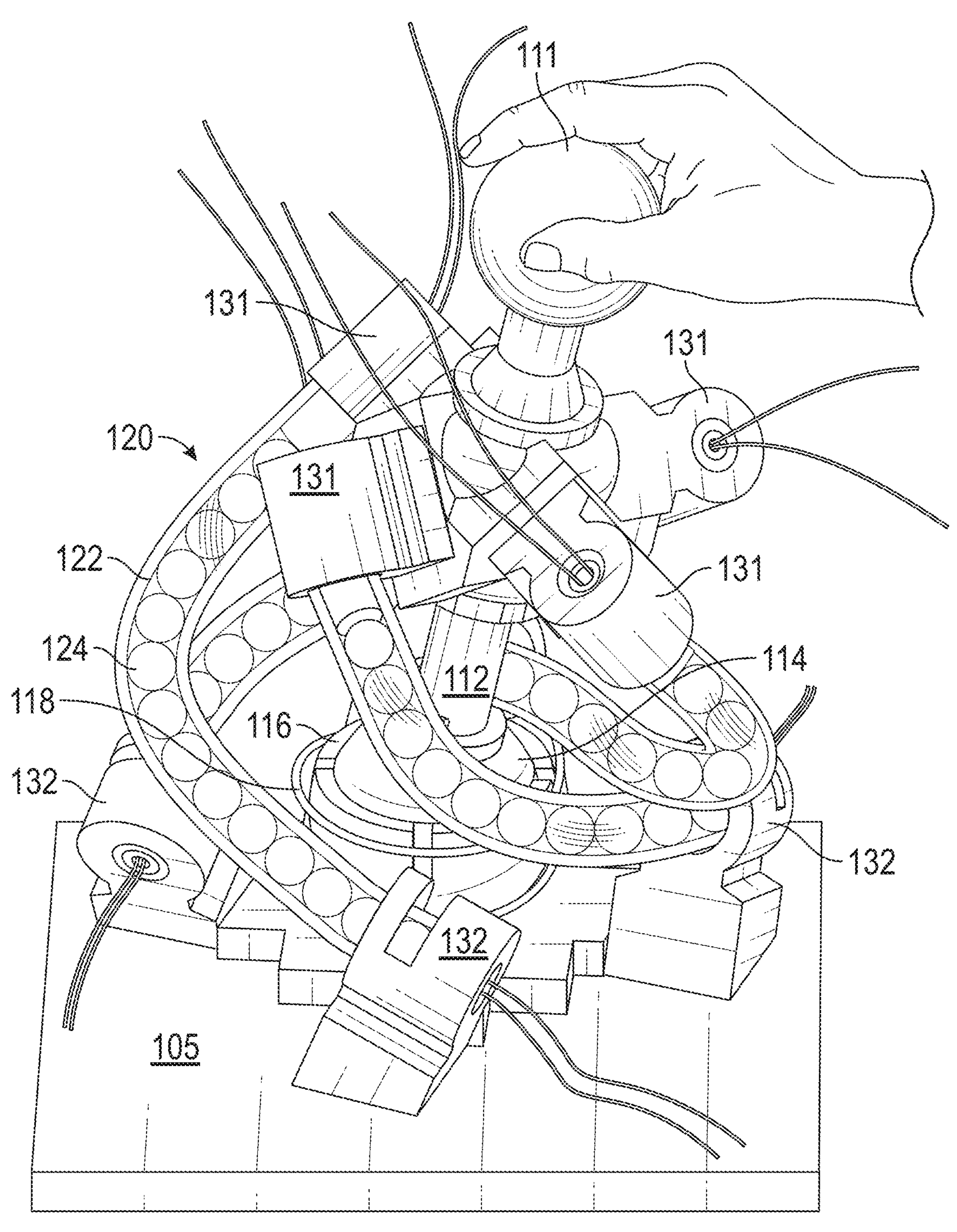
FIG. 1B is a perspective view of the controller of FIG. 1A that illustrates manipulation of the controller.
Figure 7:
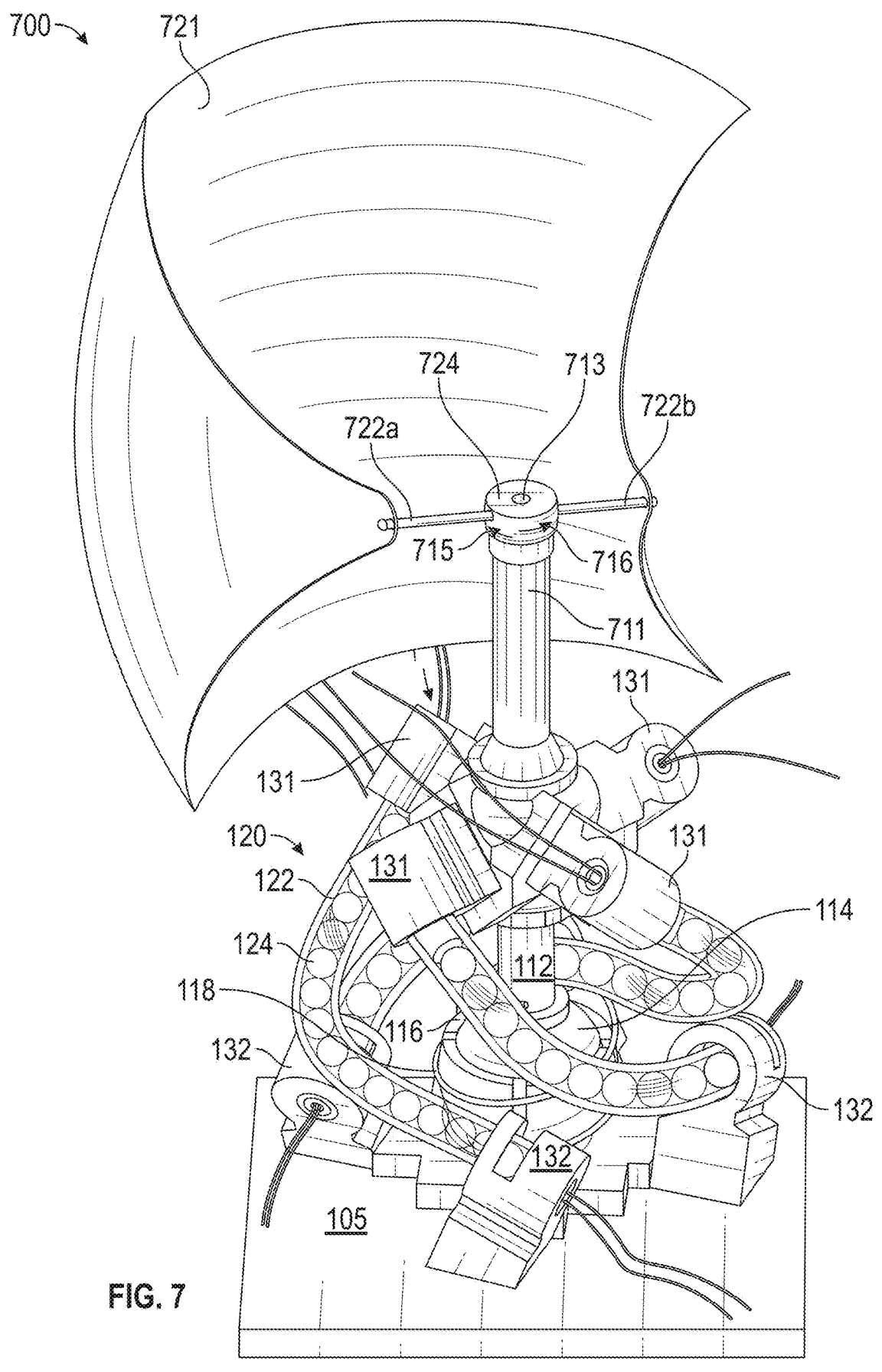

FIG. 7 is an example of an air flow sensor that may be formed from the controller of FIGS. 1A and 1B. Specifically, the handle 111 of FIG. 1A may be replaced with the air flow sensor assembly 700 of FIG. 7. The air flow sensor assembly 700 includes a mast 711 and an axle 713 coupled to a top portion of the mast 711. The air flow sensor assembly 700 also includes a sail assembly. The sail assembly includes a sail 721, which is held in place by arms 722*a*, 722*b*. The arms 722*a*, 722*b* are coupled to a wheel member 724, which, in turn, is rotatably coupled to the axle 713. As shown, the wheel member 724 enables the sail assembly to rotate in the left and right directions 715, 716. The end portions of the arms 722*a*, 722*b* may be configured to allow the sail 721 to rotate up and down in cases where a component of the air flow vector is in the up or down directions.

Similar to the air flow sensor, the controller of FIGS. 1A and 1B may be configured as a water flow sensor. For example, the sail 721 may be replaced with a fin or a paddle. In this configuration, the paddle may function as the sensor member and may be mechanically coupled to one or more flexible light guide assemblies to sense deflection caused by water currents. The water flow sensor may be deployed on the floor of a river, channel, strait, sill, sea, ocean, or other natural or manmade body of water to determine the magnitude, direction, and/or speed of the water current based on measured deformation or deflection of the one or more optical flexion sensors.

In some aspects, one or more optical flexion sensors may be integrated into a floating buoy system. For example, the sail 721 may be replaced with a fin or a paddle and the entire sensor assembly may be mounted on the underside of the floating buoy system. This orientation allows the sensors to detect directional water flow beneath the floating buoy system. In pressurized environments, the optical flexion sensor 120 may be filled with a gas, e.g., air, and sealed. Alternatively, in environments where there are no extreme pressures, the tubular structure 122 of the optical flexion sensor 120 may be made of a mesh material to provide flexibility and durability.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical system, a robotic system including a remotely controlled robotic system, or a visualization system.

Aspects of the disclosure may be incorporated into applications relating to sensing the deformation of a sensed structure straddled by the optical flexion sensor. The sensed structure may be a joint. For example, the sensed structure may be an extremity (e.g., a finger, a wrist, or an elbow), a neck, or a jaw or an animal, a human, or a robot. The sensed joint may be a ball and socket assembly. The sensed structure may include structural hinges in architectural applications, such as bridges or buildings, and in machines. The sensed structure may be a natural or man-made flexible structure. For example, the sensed structure may be a tree or an antenna. The sensed structure may be a geological structure or snow. For example, a sensor assembly incorporating the optical flexion sensors of the disclosure may be placed in the earth or snow formation to detect deformation. Such a sensor assembly placed in the earth may be used to detect landslides. A sensor assembly incorporating one or more of the optical flexion sensors may be configured for a snow formation in order to detect an impending or active avalanche.

The optical flexion sensor may be employed as a "feeler" as part of a robot navigation system. For example, the optical flexion sensor may be coupled to a robotic vehicle such as a drone, a robotic boat, a robotic submersible vehicle (e.g., a robotic submarine), or a robotic land vehicle. Multiple optical flexion sensors may be coupled to a robotic vehicle so that the robotic vehicle can sense when it is about to hit into an external object. The optical flexion sensors may be incorporated into the bumpers of the robotic vehicle.

The optical flexion sensor of the disclosure may measure any magnitude and/or direction of deflection and may operate in environments with high radiation or electromagnetic interference (EMI), e.g., a nuclear facility or outer space. In aspects, end portions of the optical flexion sensor, which include the light source 210 and the light sensor 220, may be protected with a material suitable for shielding electronic components from radiation or EMI. For example, the end portions of the optical flexion sensor may be covered by a metallic material or enclosed in a metallic container that functions as a Faraday cage.

Unlike conventional flex sensors, which are typically unidirectional and limited to detecting deformation in a single plane or direction, the optical flexion sensors of the disclosure may detect deformation in multiple directions. For example, the use of optical elements within a flexible guide allows the optical flexion sensor to bend freely and detect changes in light intensity regardless of the plane in which the sensor bends. This multi-directional sensitivity enables the controller and sensor systems of the disclosure to determine the presence, extent, and direction of deformation in complex, multi-axis environments without the need for multiple, directionally constrained sensors. As such, the controller and sensor systems of the disclosure overcome constraints associated with conventional flex sensors, e.g., capacitive or resistive sensors, that are unable to perform off-plane or compound deflections. Moreover, conventional sensors may be susceptible to environmental interference or may require complex signal conditioning circuits, whereas the optical flexion sensors of the disclosure are resilient to electromagnetic interference and are capable of operating in harsh environments, including those with radiation or fluids harmful to electronic components.

It is contemplated that the optical flexion sensors 120 of the disclosure may be employed in various applications. For example, optical flexion sensors 120 may be incorporated into wearable garments to perform a controlling and/or sensing function. For example, optical flexion sensors 120 may be incorporated into a body suit or a glove. In an example glove, an optical flexion sensor 120 may be incorporated into each of the fingers of the glove.

It is contemplated the two or more optical flexion sensors may be coupled to each other in any pattern. For example, two or more optical flexion (e.g., three) sensors may be coupled to each other in parallel in order to sense directionality of the optical flexion sensors. In another example, multiple optical flexion sensors may be coupled to each other such that some optical flexion sensors are perpendicular to other optical flexion sensors.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more microprocessors, digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements. The controllers or sensors of the disclosure may be suitable for low-power computer platforms such as the Arduino boards and may be integrated into Internet of Things (IoT) systems for continuous monitoring of mechanical states. A simple microprocessor or DSP may be used to interpret the sensor data output from the optical flexion sensors.

What is claimed is:

1. A controller comprising:

a base member;

a control member movably coupled to the base member, the control member being configured for multi-planar displacement relative to the base member;

a first flexible light guide assembly coupled between the control member and the base member, the first flexible light guide assembly including a first plurality of optical elements arranged in series within a first flexible tube, and a first light sensor coupled to the first flexible light guide assembly;

a second flexible light guide assembly coupled between the control member and the base member, the second flexible light guide assembly including a second plurality of optical elements arranged in series within a second flexible tube, and a second light sensor coupled to the second flexible light guide assembly; and a processor coupled to the first light sensor and the second light sensor, wherein the first and second flexible light guide assemblies are configured to transmit light through the optical elements via sequential optical element-to-optical element optical coupling such that bending of the first and second flexible tubes varies the intensity of transmitted light, wherein the varied light intensity corresponds to the degree of deflection of the control member; and wherein the processor is configured to output a control signal, based on the varied light intensity corresponding to the degree of deflection of the control member, to control an object.

2. The controller according to claim 1, wherein each of the first and second flexible light guides includes a series of optical elements configured to direct or transmit light along the first and second flexible light guides.

3. The controller according to claim 2, wherein the optical elements are spherical-shaped or semi-spherical-shaped optical elements configured to focus or redirect incident light.

4. The controller according to claim 2, wherein the optical elements are made of plastic, glass, acrylic, polycarbonate, or fused silica or quartz, and wherein the optical elements are arranged to maintain optical transmission during bending of the first and second flexible light guides.

5. The controller according to claim 2, wherein each of the first and second flexible light guides includes a flexible tube in which the optical elements are disposed, the flexible tube being deformable in response to mechanical motion of the control member.

6. The controller according to claim 5, wherein the flexible tube is made of polyvinyl chloride (PVC), silicone rubber, polyurethane (PU), a thermoplastic elastomer (TPE), a fluoropolymer, or a material woven into a mesh.

7. The controller according to claim 2, further comprising first and second light sources configured to direct light to a spherical optical element disposed at a first end portion of the first and second flexible light guides, respectively, the first and second light sources being configured to emit light into the first and second flexible light guides along an optical axis.

8. The controller according to claim 7, wherein the first and second light sources are laser diodes or light-emitting diodes (LEDs).

9. The controller according to claim 7, further comprising first and second light intensity sensors disposed at or near a second end portion of the first and second flexible light guides, respectively.

10. The controller according to claim 1, wherein the control member is a control stick including a ball member configured to mate with a socket in which the ball member may rotate to enable multi-plane displacement or deflection of the control member.

11. The controller according to claim 1, wherein the controller is a joystick, a control stick, a side stick, a game stick, a thumbstick, an analog stick, a manipulator stick, a control lever, or a hand controller.

12. The controller of claim 1, further comprising a third flexible light guide assembly and a fourth flexible light guide assembly each coupled between the control member and the base member, the third flexible light guide assembly including a third plurality of optical elements arranged in series within a third flexible tube and a third light sensor coupled to the third flexible light guide assembly, and the fourth flexible light guide assembly including a fourth plurality of optical elements arranged in series within a fourth flexible tube and a fourth light sensor coupled to the fourth flexible light guide assembly.

13. The controller of claim 1, wherein each optical element is a spherical lens, and wherein each spherical lens has a diameter approximately equal to a diameter of the respective flexible tube.

14. A method comprising:

receiving first light intensity data from a first light sensor configured to detect light transmitted through a first flexible light guide assembly coupled to a movable member, the first flexible light guide assembly including a first plurality of spherical lenses arranged in series within a first flexible tube;

receiving second light intensity data from a second light sensor configured to detect light transmitted through a second flexible light guide assembly coupled to the movable member, the second flexible light guide assembly including a second plurality of spherical lenses arranged in series within a second flexible tube;

determining position data of the movable member based on the first and second light intensity data; and outputting a control signal, based on a varied light intensity corresponding to a degree of deflection of the movable member, to control an object, wherein the first and second flexible light guide assemblies are configured to transmit light through the spherical lenses via sequential lens-to-lens optical coupling such that bending of the first and second flexible tubes varies the intensity of transmitted light, and wherein the varied light intensity corresponds to the degree of deflection of the movable member.

15. The method according to claim 14, wherein the position data of the movable member is transmitted to an apparatus to control operation of the apparatus.

16. The method according to claim 15, wherein the apparatus is a display, a robot, or a vehicle.

17. The method according to claim 14, wherein the position data is sensor data.

18. A sensor system comprising:

a base member;

a sensor member movably coupled to the base member;

a first flexible light guide assembly coupled between the sensor member and the base member, the first flexible light guide assembly including a first plurality of spherical lenses arranged in series within a first flexible tube and a first light sensor coupled to the first flexible light guide assembly;

a second flexible light guide assembly coupled between the sensor member and the base member, the second flexible light guide assembly including a second plurality of spherical lenses arranged in series within a second flexible tube and a second light sensor coupled to the second flexible light guide assembly; and a processor coupled to the first light sensor and the second light sensor, wherein the first and second flexible light guide assemblies are configured to transmit light through the spherical lenses via sequential lens-to-lens optical coupling such that bending of the first and second flexible tubes varies the intensity of transmitted light, wherein the varied light intensity corresponds to a degree of displacement or deformation of the sensor member, and wherein the processor is configured to output a control signal, based on the varied light intensity corresponding to the degree of displacement or deformation of the sensor member, to control an object.

19. The sensor system of claim 18, further comprising a memory having stored thereon instructions, which when executed by the processor, cause the processor to:

receive light sensor data from the first and second light sensors; and determine position data of the sensor member based on the light sensor data.

* * * * *